(12) United States Patent
Brenden et al.

(10) Patent No.: US 7,068,460 B2
(45) Date of Patent: Jun. 27, 2006

(54) LOW COST EMERGENCY DISK DRIVE HEAD RETRACT ARCHITECTURE

(75) Inventors: Jason P. Brenden, Woodbury, MN (US); James A. Dahlberg, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/955,543

(22) Filed: Sep. 30, 2004

(65) Prior Publication Data
US 2006/0007581 A1    Jan. 12, 2006

Related U.S. Application Data

(60) Provisional application No. 60/590,207, filed on Jul. 22, 2004.

(51) Int. Cl.
 *G11B 21/02* (2006.01)
(52) U.S. Cl. ...................................................... 360/75
(58) Field of Classification Search ..................... None
 See application file for complete search history.

(56) References Cited

U.S. PATENT DOCUMENTS

| | | | | |
|---|---|---|---|---|
| 4,786,995 A | * | 11/1988 | Stupeck et al. | 360/75 |
| 5,969,899 A | * | 10/1999 | Utenick et al. | 360/78.04 |
| 6,025,968 A | * | 2/2000 | Albrecht | 360/75 |
| 6,081,400 A | * | 6/2000 | Lu et al. | 360/75 |
| 6,188,192 B1 | * | 2/2001 | Chen | 318/563 |
| 6,560,057 B1 | * | 5/2003 | Klaassen et al. | 360/75 |

* cited by examiner

*Primary Examiner*—K. Wong
(74) *Attorney, Agent, or Firm*—Kinney & Lange, P.A.

(57) ABSTRACT

A disk drive emergency retract architecture for providing power to a voice coil motor (VCM) to retract a transducing head from a surface of a recordable medium during loss of power from an external power supply. The disk drive emergency retract architecture comprises a spindle motor, having an internal inductance and an internal resistance, for spinning the recordable medium. The spinning recordable medium creates a back electromotive force (BEMF) in the spindle motor. A boost circuit transfers the back electromotive force located in the spindle motor to a capacitor which stores and supplies power to the VCM. The capacitor is connected to a power switch circuit, which supplies power from the capacitor to the VCM when the power switch circuit is in a conducting state and prevents power from being supplied to by the capacitor to the VCM when the power switch circuit is in a non-conducting state. A retract circuit supplies a signal to the power switch circuit, dictating whether the power switch circuit is in the conducting state or the non-conducting state. The retract circuit operates to alternate the power switch circuit between the conducting state and the non-conducting state at a set frequency, resulting in power being provided from the capacitor to the VCM at this frequency.

20 Claims, 3 Drawing Sheets

LOW COST EMERGENCY DISK DRIVE HEAD RETRACT ARCHITECTURE

CROSS REFERENCE TO RELATED APPLICATION(S)

This application claims the benefit of U.S. Provisional Application No. 60/590,207 filed Jul. 22, 2004 for "Low Cost Emergency Disk Drive Head Retract Architecture" by J. Brenden and J. Dahlberg.

INCORPORATION BY REFERENCE

The aforementioned U.S. Provisional Application No. 60/590,207 is hereby incorporated by reference in its entirety.

BACKGROUND OF THE INVENTION

The present invention relates to disk drives and storage devices. In particular, the present invention relates to utilizing back electromotive force (BEMF) energy from the spinning spindle motor to retract the head to a safe landing zone during emergency loss of power.

Generally, a magnetic hard disk drive (HDD) includes a magnetic read/write head and several magnetic disks, each disk having concentric data tracks for storing data. The disks are mounted on a spindle motor, which causes the disks to spin. The read/write head is typically mounted on a slider, which is carried by a suspension or load beam. The load beam is attached to an actuator arm of an actuator, which moves the read/write head over the spinning disk during operation. As the disks spin, the slider suspended from the actuator arm flies a small distance above the disk surface. The slider carries a transducing head for reading from or writing to a data track on the disk.

In addition to the actuator arm, the slider suspension comprises a bearing about which the actuator arm pivots. A large scale actuator motor, such as a voice coil motor (VCM), is used to move the actuator arm (and the slider) over the surface of the disk. When actuated by the VCM, the actuator arm can be moved from an inner diameter to an outer diameter of the disk along an arc until the slider is positioned above a desired data track on the disk.

A control circuit is coupled to a coil in the VCM in order to controllably supply current to the coil. When a current is passed through the coil, a motive force is exerted on the actuator arm.

Parking zones in an HDD allow the read/write head to be safely landed after the hard drive has ceased operation. When an HDD is powered down, it usually performs certain operations before actually disconnecting from the external power source. One of these power down operations is to operate the actuator arm to move the head to the parking zone. If the head is not moved to the parking zone prior to power down, the head will land on the disk after the disk stops spinning, potentially damaging the disk and the read/write head.

During emergency loss of power, the read/write head must still be moved to the landing zone to avoid damage to the disk and the read/write head. This situation is referred to as an emergency retract. The problem is where does the power come from necessary to move the read/write head to the landing zone. One solution is to store the necessary energy within the circuit, usually through use of a large capacitor, sufficient to power the VCM during emergency retract. Another solution is to use energy inherent to the operation of the disk drive system to supply power to the VCM and move read/write head to the safe landing zone. The smaller the disk however, the less inherent energy is present to help move the read/write head to the safe landing zone.

Thus, there is a need for a design that can efficiently harness and use the inherent power available in the disk drive system to safely move the read/write head to the parking zone during emergency loss of power.

BRIEF SUMMARY OF THE INVENTION

The present invention is a disk drive emergency retract architecture for providing power to a voice coil motor (VCM) to retract a transducing head from a surface of a recordable medium during loss of power from an external power supply. The emergency retract architecture includes a spindle motor which operates to spin the recordable medium of the disk drive system. The spindle motor includes an internal inductance and an internal resistance. The spinning recordable medium induces a back electromotive force (BEMF) in the spindle motor. The emergency retract architecture includes a boost circuit which transfers the BEMF energy induced in the spindle motor to a capacitor. The capacitor provides energy received from the BEMF to the VCM. Energy stored in the capacitor is provided to the VCM through a power switch circuit, which operates to supply power to the VCM when the power switch circuit is in a conducting state, and operates to prevent power from being supplied to the VCM from the capacitor when the power switch circuit is in a non-conducting state. A retract circuit supplies a signal to the power switch circuit, dictating whether it is in the conducting state or non-conducting state. The retract circuit provides a signal, such that the power switch circuit is alternated between the conducting state and the non-conducting state at a set frequency, resulting in power being provided from the capacitor to the VCM.

DETAILED DESCRIPTION

Figure 1:
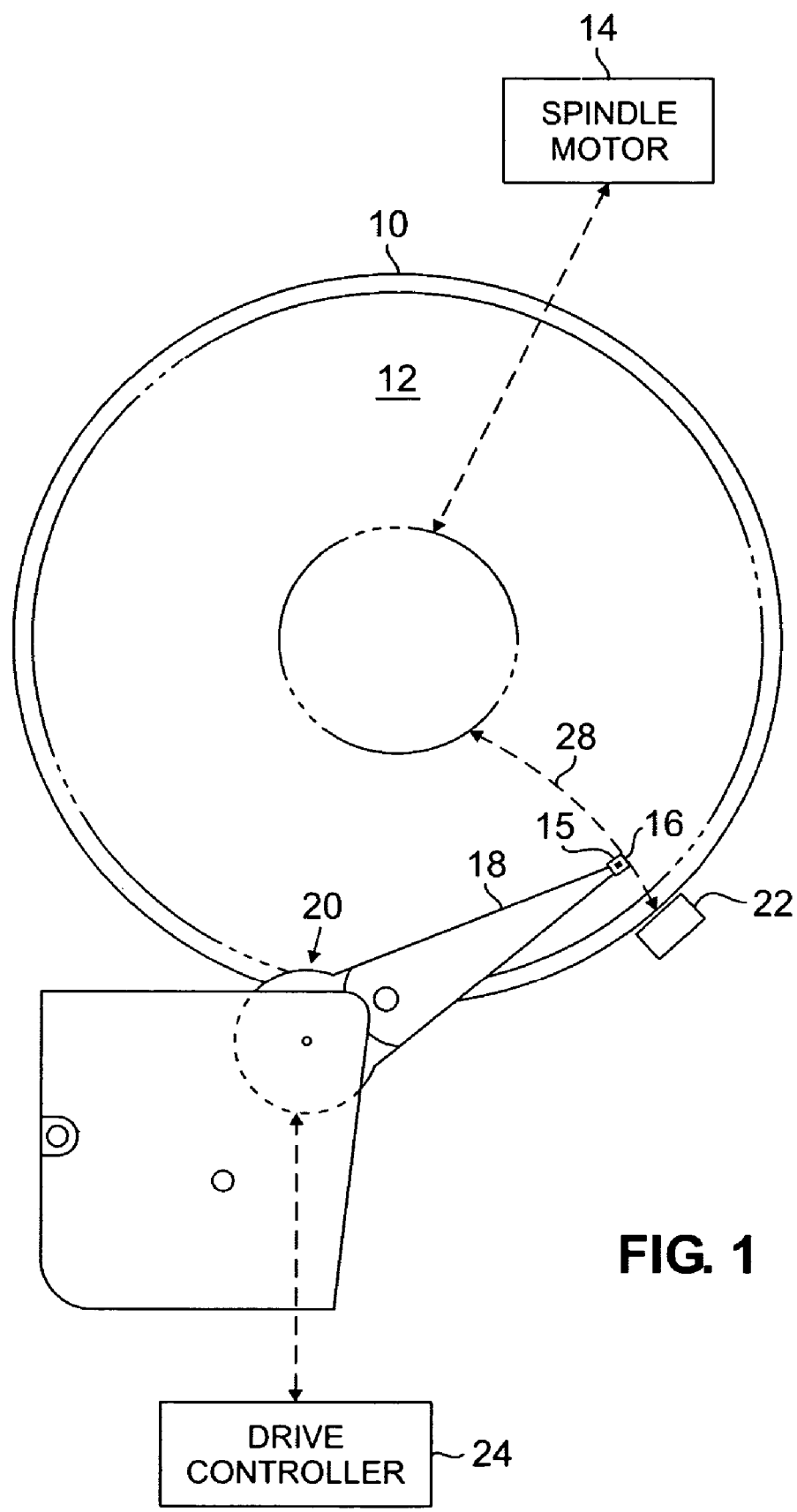
FIG. 1 is an illustration of a disk drive system with a safe parking zone.

FIG. 1 is an illustration of typical disk drive system 10. Disk drive system 10 includes disk 12, spindle motor 14, slider 15 carrying read/write head 16, actuator arm 18, voice coil motor ("VCM") 20, safe landing zone 22 and VCM control 24.

In normal operation, a drive current is provided to VCM 20 to actuate actuator arm 18. When actuated by VCM 20, actuator arm 18 can be moved from an inner diameter to an outer diameter of disk 12 along arc 28 until the read/write head 16 is positioned above a desired data track on the disk. Disk 12 includes a plurality of concentric tracks on which data and position information is recorded. Disk 12 is mounted on spindle motor 14, which causes disk 12 to spin. Read/write head 16 suspended from actuator arm 18 flies above the surface of disk 12 as it spins. Read/write head 16 is operable to read the data and position information from tracks of disk 12 and generate an input signal representative of the data and position information.

When a disk drive is powered down, it usually performs certain operations before actually disconnecting from the external power source. One of these power down operations is to operate actuator arm 18 to move read/write head 16 to safe landing zone 22. Safe landing zone 22 allows read/write head 16 to be safely landed after the disk drive 10 has ceased operation. Safe landing zone 22 is located at the outermost (as shown in FIG. 1) or innermost edge of disk 12 and typically includes a ramp to raise read/write head 16 and park it off of disk 12 in an elevated position. If the head is not moved to safe landing zone 22 prior to power down, the read/write head 16 will land on disk 12 after disk 12 stops spinning, potentially damaging disk 12 and read/write head 16.

In the event of a catastrophic shut down (i.e., external power is suddenly removed) there is no external power to perform power down procedures, including moving read/write head 16 to safe landing zone 22. Typically, a large capacitor is used to store the energy required to drive VCM such that actuator arm 18 actuates to place read/write head 16 in the safe landing zone.

Figure 2:
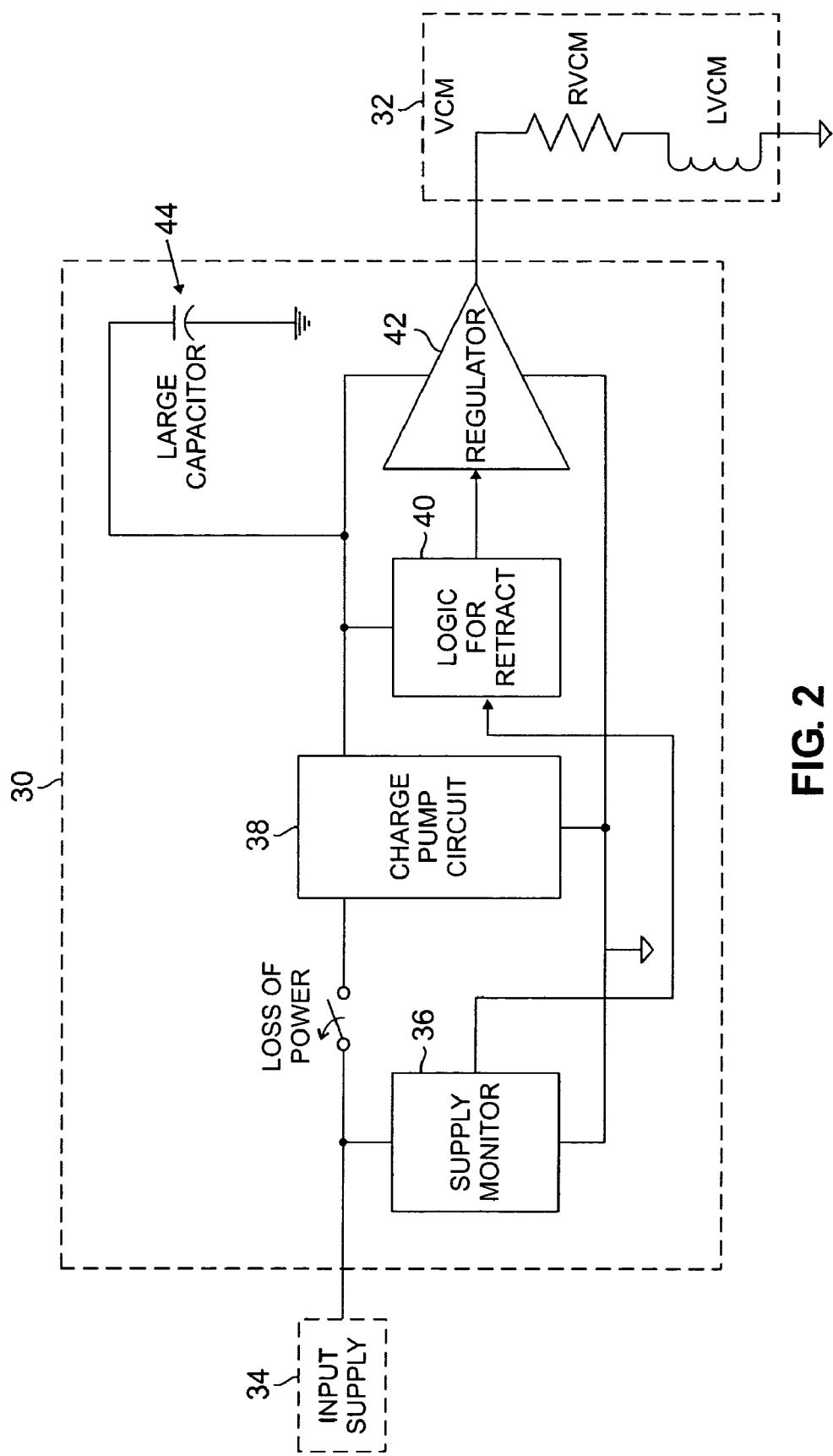
FIG. 2 is a schematic diagram of a typical VCM control circuit with emergency retract capabilities.

FIG. 2 is a schematic diagram of typical emergency retract circuit 30. Emergency retract circuit 30 operates to supply sufficient power to VCM 32 such that read/write head is moved to safe landing zone during emergency loss of power. Emergency retract circuit 30 includes external power supply 34, supply monitor 36, charge pump circuit 38, logic for retract circuit 40, voltage regulator 42, and large capacitor 44. The load components of VCM 32 are shown as resistor RVCM and inductor LVCM.

During normal operation, while external power supply 34 is still available, external power supply 34 supplies power to charge pump circuit 38. Charge pump circuit 38 operates to boost external power supply 34 in order to charge large capacitor 44 to a large voltage. Supply monitor 36 operates to detect when input voltage from external power supply 34 drops below a given threshold, indicating that emergency retract operation should begin. Supply monitor 36 sends a signal to logic for retract circuit 40, which uses the energy stored in large capacitor 44 to supply the power necessary to VCM 32 such that the read/write head is retracted to the safe landing zone. Voltage regulator 42 operates to maintain a consistent output voltage. Some of the energy stored in large capacitor 44 is lost through internal resistance of voltage regulator 42. Therefore, large capacitor 44 must be capable of storing sufficient energy to power logic for retract circuit 40 and voltage regulator 42, and to provide sufficient energy to VCM 32 such that the read/write head is moved to the safe landing zone during emergency retract.

Figure 3:
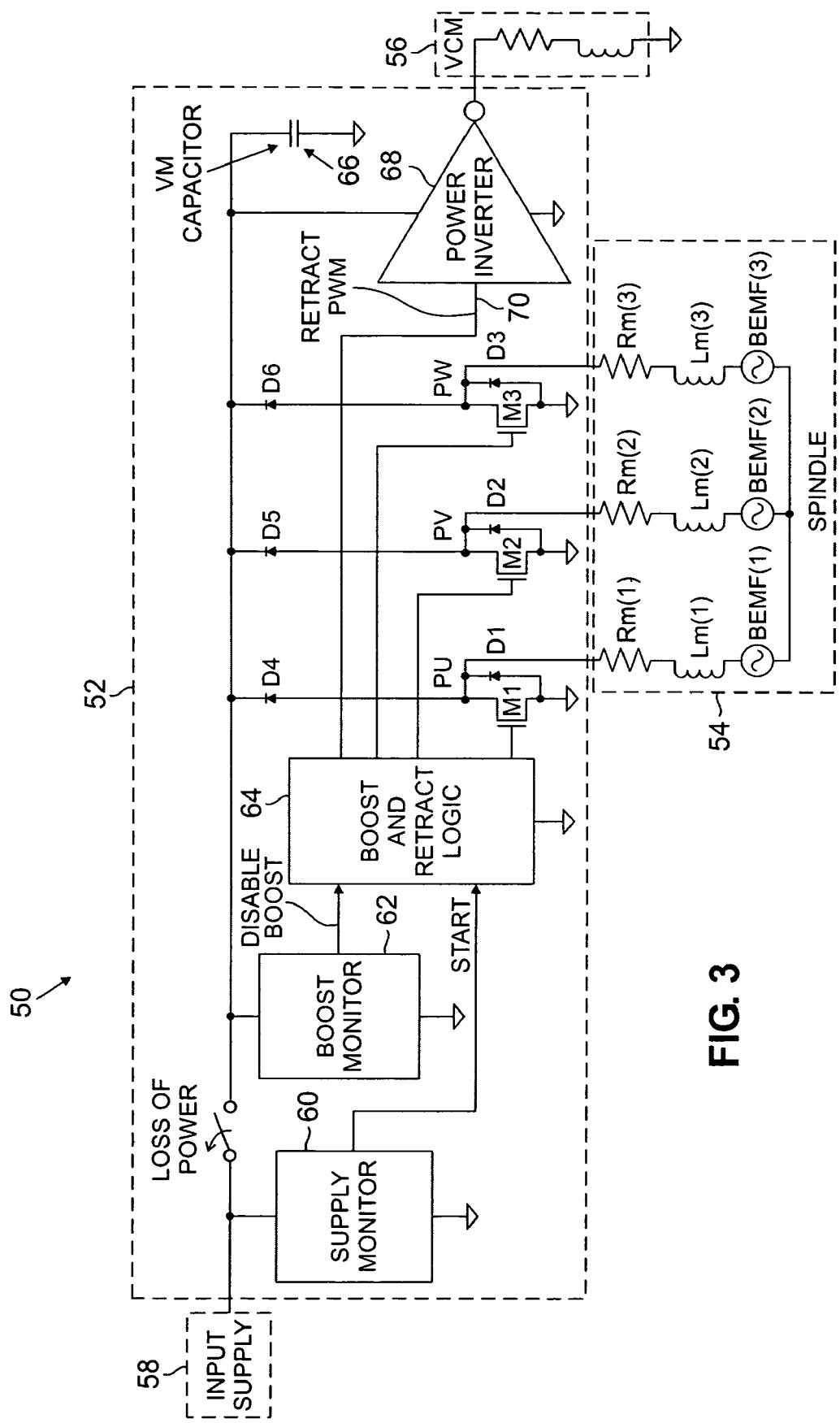
FIG. 3 is a schematic diagram of a VCM control circuit of the present invention with emergency retract capabilities.

FIG. 3 is a diagram illustrating an exemplary embodiment of the emergency retract architecture of the present invention. Emergency retract architecture 50 includes emergency retract circuitry 52, spindle motor 54, VCM 56 and external power supply 58. Spindle motor 54, as shown in FIG. 1, operates to spin the disk during operation.

In this exemplary embodiment, spindle motor 54 is a three-phase motor. The spinning of the disk by spindle motor 54 creates back electromotive forces (BEMF), inherent in every electric motor. During emergency loss of power, although no power is being supplied to spindle motor 54, inherent energy remains in spindle motor 54 due to the inertia present in the spinning disk. The use of a three phase motor in this embodiment results in the creation of three phase oscillating BEMF voltages labeled as BEMF(1), BEMF(2), and BEMF(3). Rm(1), Rm(2), and Rm(3) represents the internal resistances of the phases of spindle motor 54. Likewise, Lm(1), Lm(2), and Lm(3) represent the internal inductances of the phases of spindle motor 54.

Emergency retract circuitry 52 includes supply monitor 60, boost monitor 62, boost and retract logic 64, transistors M1, M2 and M3, VM capacitor 66, and power inverter 68. A number of diodes (D1, D2, D3, D4, D5 and D6) are shown to represent the body diode effect present in transistors that have been switched off. Therefore, when transistor M1 is turned off by boost and retract logic 64, the body diode present in transistor M1 will operate electrically as diode D1. Diodes D4, D5 and D6 are shown as diodes because during boost and retract operations, the transistors represented by D4, D5 and D6 will always be off and will therefore operate electrically as diodes. In this exemplary embodiment, MOSFET transistors M1, M2 and M3 are used, however one of ordinary skill in the art would recognize that any number of switching circuits may be used in place of transistors M1, M2 and M3.

Supply monitor 60 operates to detect when input voltage from external power supply 58 drops below a given threshold, indicating that emergency retract operation should begin. When emergency retract is necessary, supply monitor 60 sends a signal to boost and retract logic 64 to begin boosting and driving VCM 56. Boost and retract logic 64 operates to direct energy located in spindle motor 54 into VM capacitor 66.

Boost and retract logic 64 is connected to the gates of transistors M1, M2 and M3, allowing boost and retract logic 64 to selectively turn the transistors on and off. The drains of transistors M1, M2 and M3 are connected to both spindle motor 54 and VM capacitor 66 through the respective diodes D4, D5 and D6. The nodes located at the drains of transistors M1, M2 and M3 are labeled as PU, PV and PW respectively. The drains of transistors M1, M2 and M3 are each connected to a phase of three phase spindle motor 54. The drain of transistor M1 is connected through Rm(1) and Lm(1) to BEMF(1), the drain of transistor M2 is connected through Rm(2) and Lm(2) to BEMF(2), and the drain of transistor M3 is connected through Rm(3) and Lm(3) to BEMF(3). Because spindle motor 54 is a three phase motor, each BEMF voltage will be out of phase with the other two BEMF voltages. Therefore, at different points in time, nodes PU, PV and PW will have varying voltage levels corresponding to the oscillating three phases of BEMF(1), BEMF(2) and BEMF(3). The sources of transistors M1, M2 and M3 are connected to ground. Boost and retract logic 64 is also connected to power inverter 68, operating to provided a pulse width modulated (PWM) signal to power inverter 68 to alternately turn power inverter 68 on and off. When power inverter 68 is turned on, VM capacitor 66 operates to drive VCM 56.

During emergency retract operations, boost and retract logic 64 performs two functions. First, boost and retract logic 64 operates to extract energy inherent in spindle motor 54. Second, boost and retract logic 64 operates to send retract PWM signal 70 to drive inverter 68 such that power is supplied in an economic way to VCM 56. These operations are not performed in exclusionary fashion. Boost and retract logic 64 may operate to extract energy from spindle motor 54 while supplying retract PWM signal 70 to power inverter 68.

During boost operations, in which VM capacitor 66 is charged to a desired voltage level, boost and retract logic 64 operates to control a two stage cycle by alternately turning transistors M1, M2 and M3 on and off. During the first stage when transistors M1, M2 and M3 are on, current is ramped up in inductors Lm(1), LM(2) and Lm(3). During the second stage, boost and retract logic 64 turns transistors M1, M2 and M3 off such that energy stored in inductors Lm(1), Lm(2) and Lm(3) is transferred to VM capacitor 66. To understand how this works in operation, an example cycle is described. For purposes of the example, during the first stage of the cycle the BEMF voltages are assumed to be phased such that BEMF(1) represents the highest voltage, BEMF(2) represents a middle voltage, and BEMF(3) represents the lowest voltage. Therefore, node PU will be at the highest voltage level at this point in time, node PW will be at the lowest voltage level at this point in time, and node PV will be at a voltage in between nodes PU and PW. Because node PU is at a higher voltage than node PW, a current path is created from node PW to node PU. Specifically, current will travel from the ground contact of the source of transistor M3, through transistor M3 which has been turned on by boost and retract logic 64, then through Rm(3) and Lm(3), then through Lm(1) and Rm(1) to node PU, and finally through transistor M1 which has been turned on by boost and retract logic 64 to the ground contact connected to the source of transistor M1. The effect of this current path from node PW to node PU is the build up of current in inductors Lm(1) and Lm(3).

During the second stage of the boost operation, boost and retract logic 64 extracts the current built up in spindle motor inductors Lm(1), Lm(2) and Lm(3) for use in charging VM capacitor 66. The second stage is marked by boost and retract logic 64 operating to turn transistors M1, M2 and M3 off. When transistors M1, M2 and M3 are off, the current path discussed with respect to the first stage of the boost operation is broken. However, the current built up during the first stage of the boost operation is maintained by the spindle motor inductors Lm(1), Lm(2) and Lm(3) which store magnetic energy and resist rapid changes in current. Continuing the example discussed above, recall that current was flowing from node PW, through the spindle motor inductors Lm(3) and Lm(1), to node PU. Spindle motor inductors Lm(3) and Lm(1) operate to maintain this current even after transistors M1, M2 and M3 are turned off. Current continues to flow through inductors Lm(3) and Lm(1) due to the nature of inductors in resisting changes in current. By turning transistors M1, M2 and M3 off the current path is altered, such that current now flows from ground, through diode D3 representing the body diode effect of transistor M3, through Rm(3) and Lm(3), then through Lm(1) and Rm(1) to node PU. Because transistor M1 is off, current will flow through diode D4 and into VM capacitor 66, resulting in the charging of VM capacitor 66.

As stated above, boost and retract logic 64 operates transistors M1, M2 and M3 to create a two stage cycle, meaning that boost and retract logic 64 will turn transistors M1, M2 and M3 on and off a number of times during a single retract operation. Thus, boost and retract logic 64 operates the transistors in order to alternate between ramping up current in spindle motor inductors Lm(1), Lm(2) and Lm(3) and providing this current to VM capacitor 66. In this manner, VM capacitor 66 can be regulated to any arbitrary voltage level desired. This differs from other methods, which provide the BEMF voltage from a spindle motor directly to a capacitor. This method only allows the capacitor to be charged to a voltage less than or equal to that of the BEMF voltage provided by the spindle motor. In the exemplary embodiment of the invention described above, because a current is provided by spindle motor inductors Lm(1), Lm(2) and Lm(3), the voltage of VM capacitor 66 may be charged to any arbitrary voltage, and may in fact be higher than the voltage level provided by BEMF(1), BEMF(2) and BEMF(3). In an exemplary embodiment, the duty cycle of the two stages just described is selectable over a range of 50% to 90% by a programmable register.

The other function of boost and retract logic 64 is to provide retract PWM signal 70 to power inverter 68, such that VCM 56 is operated to retract the read/write head. A power inverter is described in this exemplary embodiment, although one of ordinary skill in the art would recognize that any number of circuits may be utilized to perform the function of power inverter 68. The exemplary embodiment of the present invention shown in FIG. 3 utilizes pulse width modulation (PWM) through power inverter 68 to provide VCM 56 with a number of discrete power bursts. When power inverter 68 is on, power is drawn from VM capacitor 66, through power inverter 68, to VCM 56. Retract PWM signal 70 operates to provide a number of short power burst at regular intervals to provide an overall average amount of power to VCM 56. Retract PWM signal 70 is described in terms of duty cycles, defined as the amount of time the signal is in an active state compared with the total cycle of the PWM. For example, in one exemplary embodiment of the present invention, retract PWM signal 70 has a duty cycle of 15%, meaning that power inverter 68 is turned on 15% of the time and turned off 85% of the time. The duty cycle is selected by a programmable register which is capable of producing duty cycles ranging from 0% to 100%. In this method, the mechanical nature of VCM 56 can be taken advantage of, allowing the inertia of VCM to continue moving the read/write head during periods when power inverter 68 is turned off and no power is supplied to VCM 56. Use of retract PWM signal 70 results in an economic use of the energy stored in VM capacitor 66. For example, if boost and retract logic 64 sends retract PWM signal 70 with a duty cycle of 15%, then power inverter 68 draws power from VM capacitor 66 only 15% of the time.

The use of power inverter 68, in contrast with the voltage regulator used in the prior art and shown in FIG. 2, also allows for more economic use of the stored energy in VM capacitor 66. VCM 56 only draws power when retract PWM signal 70 turns power inverter 66 on. When power inverter 66 is off, negligible current is drawn from VM capacitor 66. In one exemplary embodiment, power inverter 66 makes use of complimentary metal oxide semiconductors (CMOS).

In one exemplary embodiment of the present invention, retract PWM signal 70 is the inverse of the cycle in which transistor M1, M2 and M3 are turned on and off. In this embodiment, when PWM signal is such that power inverter 68 is on, then transistors M1, M2 and M3 are off. For example, if PWM signal has a duty cycle of 15%, then power inverter 68 will be on 15% of the time. This means that transistors M1, M2 and M3 will be on 85% of the time, and off 15% of the time. The benefit of this arrangement, is that during the 15% of the duty cycle in which power inverter 68 draws power from VM capacitor 66, it may also draw power from the inductor current provided by inductors Lm(1), Lm(2) and Lm(3) being used to charge VM capacitor 66. This allows for the capacitance of VM capacitor 66 to be even smaller.

The present invention therefore describes an architecture for utilizing back electromotive forces from the disk drive spindle motor to retract the read/write head from the surface of the disk to a safe landing zone during emergency loss of power situations. The architecture includes a boost circuit which transfers energy from the spindle motor to a capacitor. The energy is then provided to the voice coil motor such that the read/write head is moved away from the disk and placed on the safe landing zone.

Although the present invention has been described with reference to preferred embodiments, workers skilled in the art will recognize that changes may be made in form and detail without departing from the spirit and scope of the invention.

The invention claimed is:

1. A disk drive emergency retract architecture for providing power to a voice coil motor (VCM) to retract a transducing head from a surface of a recordable medium during loss of power from an external power supply, the disk drive emergency retract architecture comprising:
a spindle motor for spinning the recordable medium, wherein the spindle motor includes an internal inductance and wherein the spinning recordable medium creates a back electromotive force (BEMF) in the spindle motor;
a capacitor for storing and supplying power to the VCM;
a switching circuit connected to the spindle motor, wherein the switching circuit causes only the internal inductance of the spindle motor to store the BEMF when in a first state and causes energy stored in the internal inductance of the spindle motor to be transferred to the capacitor when in a second state; and
a logic circuit connected to selectively place the switching circuit in the first state following loss of power from the external power supply and in the second state following the first state.

2. The disk drive emergency retract architecture of claim 1, wherein the switching circuit includes:
a first switching sub-circuit controlled by the logic circuit to be in either a conducting state or a non-conducting state;
a second switching sub-circuit controlled by the logic circuit to be in either a conducting state or a non-conducting state; and
wherein the logic circuit is operable to selectively place the first switching sub-circuit and the second switching sub-circuit in the conducting state, such that the BEMF created by the spinning recordable medium causes a first current to flow in a first current path through the first switching sub-circuit, the internal inductance of the spindle motor, and the second sub-circuit, causing energy to be stored only in the internal inductance of the spindle motor.

3. The disk drive emergency retract architecture of claim 2, wherein the logic circuit is operable to selectively place the first switching sub-circuit and the second switching sub-circuit in the non-conducting state, such that the energy stored in the internal inductance of the spindle motor causes a second current to flow in a second current path from the spindle motor to the capacitor, causing energy to be stored in the capacitor.

4. The disk drive emergency retract architecture of claim 3, further including:
a power switch circuit connected to the capacitor and to the VCM, wherein the power switch circuit supplies power to the VCM from the capacitor when the power switch circuit is in a conducting state and prevents power from being supplied by the capacitor to the VCM when the power switch circuit is in a non-conducting state.

5. The disk drive emergency retract architecture of claim 4, wherein the second current supplies power to the VCM when the power switch circuit is placed in the conducting state by the retract circuit.

6. The disk drive emergency retract architecture of claim 1, wherein the spindle motor is a three-phase motor, resulting in a first BEMF, a second BEMF out of phase with the first BEMF, and a third BEMF out of phase with the first BEMF and the second BEMF, wherein the switching circuit includes;
a first transistor connected to the spindle motor such that the first transistor sources or sinks current depending on the value of the first BEMF;
a second-transistor connected to the spindle motor such that the second transistor sources or sinks current depending on the value of the second BEMF;
a third-transistor connected to the spindle motor such that the third transistor sources or sinks current depending on the value of the third BEMF; and
wherein the logic circuit is operable to place the first transistor, the second transistor, and the third transistor in a conducting state, allowing the internal inductance of the spindle motor to store energy provided by the first BEMF, the second BEMF and the third BEMF.

7. The disk drive emergency retract architecture of claim 6, wherein the logic circuit is operable to place the first transistor, the second transistor, and the third transistor in a non-conducting state, such that the energy stored in the internal inductance of the spindle motor is transferred to the capacitor.

8. A method for retracting a read/write head during emergency loss of power, the method comprising:
creating a first current path such that energy associated with a back electromotive force (BEMF) created in a spindle motor by the inertia of a spinning disk is transferred only to an internal inductance within the spindle motor;
creating a second current path such that energy transferred to the internal inductance of the spindle motor is transferred to a capacitor, wherein the internal inductance of the spindle motor provides a charging voltage to the capacitor greater than a voltage provided by the BEMF;
supplying energy stored in the capacitor to a power switch circuit, wherein the power switch circuit operates to supply power to a retract motor when the power switch circuit is in a conducting state, and prevents power from being supplied by the capacitor when the power switch circuit is in a non-conducting state; and
driving the retract motor by alternating the power switch circuit between the conducting state and the non-conducting state.

9. The method of claim 8, the step of creating a first current path includes:
switching a first switching circuit and a second switching circuit to a conducting state, the BEMF causing a first current to flow through the first current path such that inductive energy is stored only in the internal inductance of the spindle motor.

10. The method of claim 8, the step of creating a second current path includes:
switching a first switching circuit and a second switching circuit to a non-conducting state, the energy stored in the internal inductance of the spindle motor causing a second current to flow through the second current path such that energy stored in the internal inductance of the spindle motor is transferred to the capacitor.

11. The method of claim 10, further including applying the second current to the power switch circuit, such that the inductive energy stored in the internal inductance of the spindle motor is applied to the retract motor when the power switch circuit is in the conducting state.

12. A emergency retract architecture for retracting a transducing head from a disk to a safe landing zone during emergency loss of power, the emergency retract architecture comprising:
 a voice coil motor (VCM) for retracting the transducing head when power is supplied to the VCM;
 a three phase electric motor for spinning the disk, wherein the spinning disk creates a three phase back electromotive force in the electric motor and wherein the electric motor further comprises an internal inductance;
 a capacitor coupled to the electric motor;
 a power switch circuit, wherein the power switch circuit operates to supply power from the capacitor to the VCM when the power switch circuit is in a conducting state and prevents power from being supplied by the capacitor when the power switch circuit is in a non-conducting state;
 at least one switching circuit having a conducting state and a non-conducting state; and
 a control circuit connected to the at least one switching circuit and to the power switch circuit, wherein the control circuit places the at least one switching circuit in the conducting state, causing current to build up only in the internal inductance of the electric motor and wherein the control circuit places the at least one switching circuit to the non-conducting state, causing current to be drawn from the internal inductance of the electric motor to the capacitor, and wherein the control circuit further operates to alternately place the power switch circuit between the conducting state and the non-conducting state at a given frequency, such that power stored in the capacitor is supplied to the VCM at the frequency dictated by the control circuit.

13. The emergency retract architecture of claim 12, wherein the control circuit places the at least one switching circuit in the conducting state at all times that the control circuit places the power switch circuit in the non-conducting state, and wherein the control circuit places the at least one switching circuit in the non-conducting state at all times that the control circuit places the power switch circuit in the conducting state.

14. The emergency retract architecture of claim 13, wherein the control circuit places the at least one switching circuit in the conducting state 85% of the time, and wherein the control circuit places the power switch circuit in the conducting state 15% of the time.

15. The emergency retract architecture of claim 12, wherein the control circuit places the at least one switching circuit in the conducting state at the same time as the control circuit places the power switch circuit in the conducting state.

16. A disk drive emergency retract architecture for providing power to a voice coil motor (VCM) from a back electromotive force (BEMF) generated in a spindle motor to retract a transducing head from a surface of a recordable medium during loss of power from an external power supply, the disk drive emergency retract architecture comprising:
 a capacitor for storing and supplying power to the VCM;
 a switching circuit connected to the spindle motor, wherein the switching circuit causes only an internal inductance of the spindle motor to store the BEMF when in a first state and causes energy stored in the internal inductance of the spindle motor to be transferred to the capacitor when in a second state; and
 a logic circuit connected to selectively control the state of the switching circuit such that the capacitor is charged to a voltage level greater than a voltage provided by the BEMF.

17. The disk drive emergency retract architecture of claim 16, wherein the switching circuit comprises:
 a first switching sub-circuit controlled by the logic circuit to be in either a conducting state or a non-conducting state;
 a second switching sub-circuit controlled by the logic circuit to be in either a conducting state or a non-conducting state; and
 wherein the logic circuit is operable to selectively place the first switching sub-circuit and the second switching sub-circuit in the conducting state, such that the BEMF generated in the spindle motor causes a first current to flow in a first current path between the first switching sub-circuit and the second switching sub-circuit and through the spindle motor, the first current flowing through the spindle motor causing energy to be stored only in the internal inductance of the spindle motor.

18. The disk drive emergency retract architecture of claim 17, wherein the logic circuit is operable to selectively place the first switching sub-circuit and the second switching sub-circuit in the non-conducting state, such that the energy stored in the internal inductance of the spindle motor causes a second current to flow in a second current path from the spindle motor to the capacitor, causing energy to be stored in the capacitor.

19. The disk drive emergency retract architecture of claim 17, wherein the first switching sub-circuit is comprised of at least one transistor.

20. The disk drive emergency retract architecture of claim 17, wherein the second switching sub-circuit is comprised of at least one transistor.

* * * * *